Oct. 30, 1951          J. R. LAWSON          2,572,937
FISHING POLE REST
Filed May 6, 1949
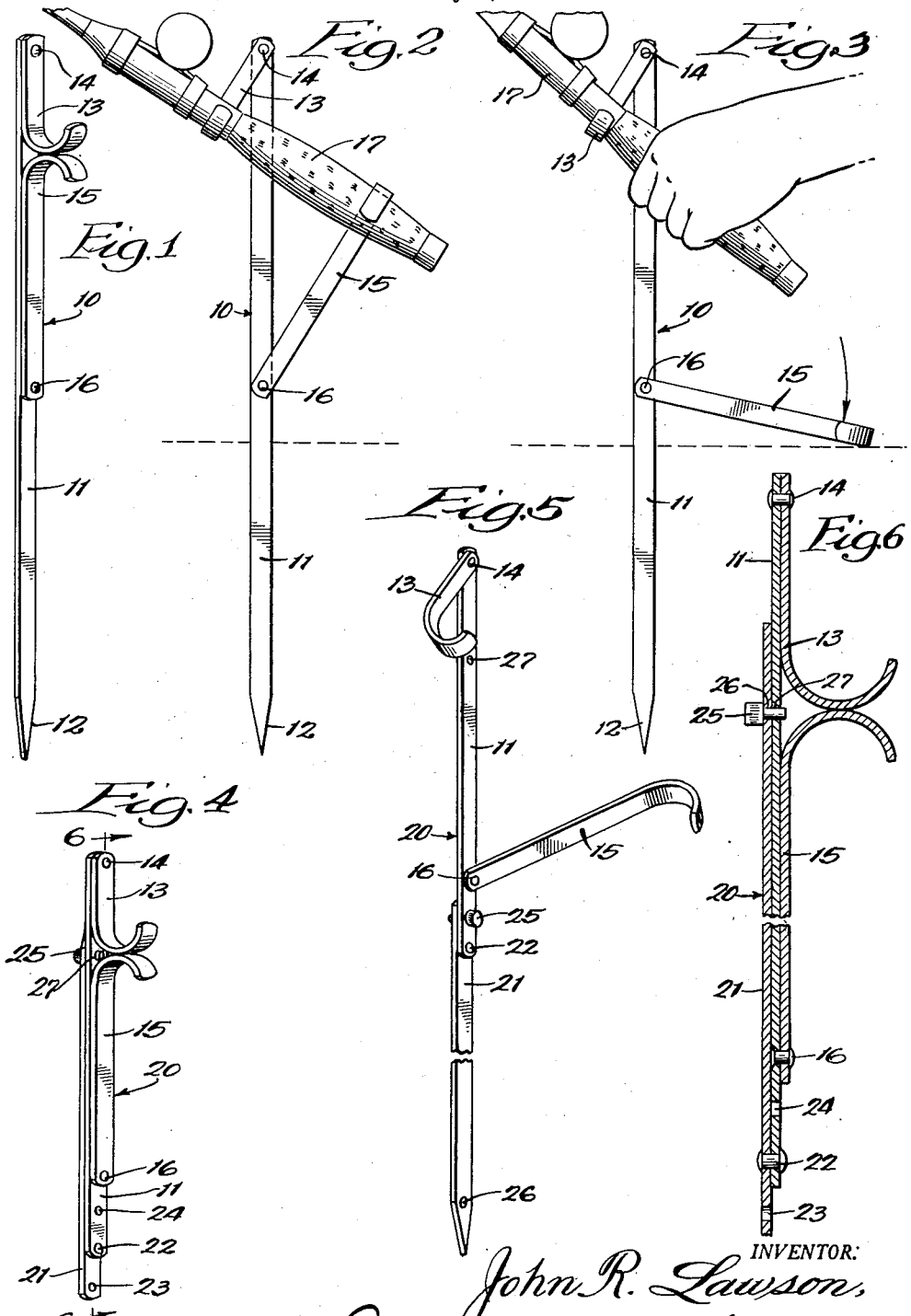
INVENTOR:
John R. Lawson,
BY *Dawson, Ome, Bartlett & Spangenberg*
ATTORNEYS.

Patented Oct. 30, 1951

2,572,937

UNITED STATES PATENT OFFICE 2,572,937

FISHING POLE REST

John R. Lawson, Topeka, Kans.

Application May 6, 1949, Serial No. 91,850

1 Claim. (Cl. 248—42)

This invention is directed to a fishing pole rest.

The principal object of this invention is to provide an improved fishing pole rest which may be readily collapsed into a compact unit for ready transportation or inclusion in a tackle box, which may be extended efficiently to support a fishing pole, which may be readily stationarily mounted, which is simple to use, which will not interfere with fishing operations, which is rugged in construction, and which may be inexpensively manufactured.

Preferably the fishing pole rest includes a supporting bar which is adapted at one end to be stationarily mounted. A first hook is pivotally mounted on the supporting bar at the other end thereof and is adapted to be aligned along the bar or swung outwardly therefrom. A second hook is pivotally mounted on the bar intermediate the ends of the bar and is adapted to be aligned along the bar toward the first hook or swung outwardly therefrom.

When the hooks are swung outwardly in opposite directions from the supporting bar they form spaced supports for the fishing pole for holding the same in proper position. When the hooks are swung inwardly in alignment with the supporting bar a compact unit is provided which may be readily transported or included in a tackle box. If desired, the supporting bar may be provided with a pivoted extension bar which may be extended or contracted thus making possible a still more compact unit for transportation or inclusion in a tackle box.

Other objects of this invention reside in the details of construction of the fishing pole rest and the cooperative relationship between the component parts thereof.

Other objects and advantages will become apparent to those skilled in the art upon reference to the accompanying specification, claim and drawings in which:

Figure 1 is a perspective view of one form of the fishing pole rest collapsed into a compact unit;

Figure 2 is a side elevational view of the fishing pole rest of Fig. 1 showing the same stationarily mounted and supporting a fishing pole;

Figure 3 is a view similar to Fig. 2, but illustrating the operation of the fishing pole rest as the fishing pole is being removed therefrom;

Fig. 4 is a perspective view of another form of a fishing pole rest provided with an extension bar, showing the fishing pole rest collapsed into a compact unit;

Fig. 5 is a view similar to Fig. 4, but showing the extension bar extended for use, and Fig. 6 is an enlarged sectional view taken substantially along the lines 6—6 of Fig. 4.

Referring first to Figs. 1 to 3 the fishing pole rest is generally designated at 10. It includes a supporting bar 11 which is adapted at one end to be stationarily mounted. In this respect the lower end of the supporting bar 11 is pointed as at 12 and may be stuck into the ground for stationarily mounting the same.

A first hook 13 is pivotally mounted on the supporting bar 11 at the other end thereof by a rivet 14. The hook 13 is adapted to be aligned along the bar as illustrated in Fig. 1 or swung outwardly therefrom as illustrated in Fig. 2. A second hook 15 is pivotally mounted on the supporting bar 11 at a point intermediate the ends of the bar by means of a rivet 16. The second hook is adapted to be aligned along the bar toward the first hook as illustrated in Fig. 1 or swung outwardly therefrom as illustrated in Figs. 2 and 3.

The hooks 13 and 15 when swung outwardly in opposite directions as shown in Fig. 2 operate to provide spaced supports for a fishing pole 17. In this way the fishing pole is securely supported by the fishing pole rest. During the fishing operation when it is desired to remove the fishing pole from the fishing pole rest, the pole is tilted and as soon as it is released from the hook 15 the hook 15 falls downwardly as illustrated in Fig. 3 so that the fishing pole may be freely manipulated without interference by the fishing pole rest.

When the hooks 13 and 15 are swung inwardly in alignment with the supporting bar 11 a compact unit is provided which may be readily transported or included in a fishing tackle box.

Referring now to Figs. 4, 5 and 6 another form of the fishing pole rest is generally designated at 20. It includes a supporting bar 11 and hooks 13 and 15 as in the form of the invention illustrated in Figs. 1 to 3 and operates in the same manner as pointed out above in connection with Figs. 1 to 3. Like reference characters have been utilized for like parts. In the form of the invention illustrated in Figs. 4 to 6 the supporting rod 11 is somewhat shorter and is provided with an extension bar 21 which may be extended or retracted. The extension bar 21 is pivoted at one end to the lower end of the supporting bar 11 by means of a rivet 22. The extension bar is provided with a hole 23 which registers with a hole 24 in the supporting bar when the extension bar is extended as illustrated in Fig. 5 and the extension bar is secured in the extended position by a suitable pin 25 extending through these registering holes. The extension bar is also provided with a hole 26 which registers with a hole 27 in the supporting bar 11 when the extension bar is retracted as illustrated in Figs. 4 and 6 and the extension bar is held in the retracted position by the pin 25 located in the registering holes 26 and 27.

Thus when the fishing pole rest is collapsed into a compact unit it takes even less room than the fishing pole rest of Figs. 1 to 3. It is, therefore, more easily transported and included in a tackle box.

While for purposes of illustration two forms of this invention have been disclosed, other forms thereof may become apparent to those skilled in the art upon reference to this disclosure, and therefore, this invention is to be limited only by the scope of the appended claim.

I claim:

A fishing pole rest comprising an upright supporting bar adapted at its lower end to be stationarily mounted, a first hook freely pivotally mounted on the upper end of the supporting bar and normally extending downwardly along the supporting bar and having an upwardly facing hook portion and adapted to be swung outwardly from the supporting bar, and a second hook freely pivotally mounted on the supporting bar intermediate the ends of the supporting bar and normally extending upwardly along the supporting bar and having a downwardly facing hook portion and adapted to be swung outwardly from the supporting bar, the hooks when swung inwardly toward each other along the supporting bar having their hook portions lying adjacent each other and forming a compact unit, the hooks when swung outwardly in opposite directions from the supporting bar having their hook portions forming spaced supports for a fishing pole, and the hooks being held outwardly from the supporting bar by the pressure of the fishing pole on the hook portions thereof and falling by gravity when the fishing pole pressure is released.

JOHN R. LAWSON.

REFERENCES CITED

The following references are of record in the file of this patent:

UNITED STATES PATENTS

| Number | Name | Date |
|---|---|---|
| 822,793 | Weber | June 5, 1906 |
| 1,450,802 | Frye | Apr. 3, 1923 |
| 2,202,739 | Kilby | May 28, 1940 |

FOREIGN PATENTS

| Number | Country | Date |
|---|---|---|
| 163,884 | Great Britain | June 2, 1921 |
| 552,331 | France | Apr. 28, 1923 |